US012775380B2

(12) United States Patent
Johnson et al.

(10) Patent No.: US 12,775,380 B2

(45) Date of Patent: Oct. 27, 2026

(54) METHOD AND SYSTEM TO EFFICIENTLY IMPLEMENT LOW LATENCY UPLOADS WITH A SHARD STASH TO A CLOUD STORAGE SYSTEM

(71) Applicant: Backblaze, Inc., San Mateo, CA (US)

(72) Inventors: Timothy Johnson, Franklin, MA (US); Malay Shah, Los Altos, CA (US); Jerry Sha, Fremont, CA (US)

(73) Assignee: Backblaze, Inc., San Mateo, CA (US)

(*) Notice: Subject to any disclaimer, the term of this patent is extended or adjusted under 35 U.S.C. 154(b) by 0 days.

(21) Appl. No.: 18/920,785

(22) Filed: Oct. 18, 2024

(65) Prior Publication Data

US 2026/0111114 A1 Apr. 23, 2026

(51) Int. Cl.
*G06F 3/00* (2006.01)
*G06F 3/06* (2006.01)

(52) U.S. Cl.
CPC .......... *G06F 3/0611* (2013.01); *G06F 3/0655* (2013.01); *G06F 3/067* (2013.01)

(58) Field of Classification Search
CPC ....... G06F 3/0611; G06F 3/0655; G06F 3/067
See application file for complete search history.

(56) References Cited

U.S. PATENT DOCUMENTS 10,635,334 B1 * 4/2020 Chopra ................. G06F 3/0605
10,853,315 B1 12/2020 Faibish et al.
2013/0179480 A1 * 7/2013 Agarwal ................. G06F 16/16 707/822
2014/0082145 A1 * 3/2014 Lacapra ................ H04L 69/164 709/219
2019/0007438 A1 * 1/2019 Viktorov ................. H04L 63/20
2019/0253496 A1 8/2019 Tan et al.
2020/0372163 A1 11/2020 Chung
2022/0075544 A1 3/2022 Gupta et al.
2023/0014785 A1 1/2023 Karr
2023/0362248 A1 11/2023 Gallego et al.
2024/0330187 A1 * 10/2024 Xiang ................. G06F 12/0813

OTHER PUBLICATIONS

PCT International Search Report and Written Opinion for International Appln. No. PCT/US2023/051341, Applicant Backblaze, Inc., dated Dec. 30, 2025.

Gale, N. "Cloud Storage Vs. Backup: B2, Backup, or Both?," Backblaze, URL: https://www.backblaze.com/blog/cloud-storage-vs-backup-to-b1-b2-or-both/, dated Sep. 1, 2020.

Cohen, P., "The Cloud's Software: A Look Inside Backblaze," Backblaze, URL: https://www.backblaze.com/blog/the-clouds-software-a-look-inside-backblaze/, dated Mar. 10, 2017.

(Continued)

*Primary Examiner* — Craig S Goldschmidt

(74) *Attorney, Agent, or Firm* — Vista IP Law Group, LLP

(57) ABSTRACT

Disclosed is an approach to perform uploads to a cloud storage system. The improved approach serves to improve upload performance, particularly for smaller uploads, without sacrificing data durability or shard file integrity.

18 Claims, 10 Drawing Sheets

(56) References Cited

OTHER PUBLICATIONS

Klein, A., "How Backblaze Scales Our Storage Cloud," Backblaze, URL: https://www.backblaze.com/blog/how-backblaze-scales-our-storage-cloud/, dated May 21, 2024.
Beach, B., "Backblaze Vaults: Zettabyte-Scale Cloud Storage Architecture," Backblaze, URL: https://www.backblaze.com/blog/vault-cloud-storage-architecture/, dated Jun. 18, 2019.
Wilson, B., "Backblaze Durability Calculates at 99.999999999%—And Why It Doesn't Matter," Backblaze, URL: https://www.backblaze.com/blog/cloud-storage-durability/, dated Jul. 17, 2018.
Klein, A., "The Drive Stats of Backblaze Storage Pods," Backblaze, URL: https://www.backblaze.com/blog/the-drive-stats-of-backblaze-storage-pods/, dated Jan. 3, 2024.
Nufire, T., "The Hardware Inside Backblaze B2 Cloud Storage: Storage Pod 5.0," Backblaze, URL: https://www.backblaze.com/blog/cloud-storage-hardware/, dated Nov. 10, 2015.
Patterson, P., "How We Achieved Upload Speeds Faster Than Aws S3," Backblaze, URL: https://www.backblaze.com/blog/2023-performance-improvements/, dated Nov. 2, 2023.
Gale, N., "What Is an API?," Backblaze, URL: https://www.backblaze.com/blog/what-is-an-api/, dated Aug. 13, 2020.
Rivas, K., "Cloud Storage Performance: The Metrics That Matter," Backblaze, URL: https://www.backblaze.com/blog/cloud-storage-performance-the-metrics-that-matter/, dated Oct. 24, 2023.
Klein, A., "Yes, Backblaze Just Ordered 100 Petabytes of Hard Drives," Backblaze, URL: https://www.backblaze.com/blog/400-petabytes-cloud-storage/, dated Oct. 5, 2017.
Nowak, B., "Backblaze Network Stats," Backblaze, URL: https://www.backblaze.com/blog/backblaze-network-stats/, dated Dec. 14, 2023.
Klein, A., "Storage Pod 4.0: Direct Wire Drives," Backblaze, URL: https://www.backblaze.com/blog/backblaze-storage-pod-4/, dated Mar. 19, 2014.
Klein, A., "A Behind the Scenes Look at Designing the Next Storage Pod," Backblaze, URL: https://www.backblaze.com/blog/designing-the-next-storage-pod/, dated Sep. 1, 2015.

* cited by examiner

METHOD AND SYSTEM TO EFFICIENTLY IMPLEMENT LOW LATENCY UPLOADS WITH A SHARD STASH TO A CLOUD STORAGE SYSTEM

BACKGROUND

In a cloud computing environment, computing systems and services may be provided as a service to user. For example, a common use of the cloud computing model is to provide cloud-based storage to users of the service. With this approach, the user's data may employ the cloud service to store some or all of the user's data to the cloud. The content that is uploaded to the cloud may then be accessed by the users for download at any time.

One common use scenario for cloud-based storage is to provide a backup solution for users. For a given personal computer (PC) or server managed by a user, the contents of that PC or server may be uploaded to the cloud-based storage to back up all or selected portions of the data on the PC or server. This provides a secure and cost-effective backup solution for many users that cannot otherwise efficiently develop or maintain their own on-premises backup system due to cost or technical expertise reasons.

Another common use scenario is to place uploaded content into a cloud-based location such that multiple downstream consumers of the uploaded content can now more easily access that content. By way of a simple illustrative example, consider an end user that has recorded a very large video file. That end user may be desirous of having that video file be operated upon by multiple downstream video processing services. For example, the user may seek to have closed captioning applied by a first downstream service, video format conversion applied by a second downstream services, and cleanup/editing/artifact removal applied by a third downstream service. With this approach, the user can upload the video file to the cloud-based storage system, and then provide an access link to any number of downstream services to access that content through the cloud. In this way, the cloud-based storage system provides a very efficient approach to distribute the uploaded content to multiple downstream downloaders/consumers of that content.

The issue addressed by this document is that it is possible that a significant amount of upload cost and latency is expended to upload the entirety of the content to the cloud service. During an upload process, the upload is not normally considered to be successfully completed until an acknowledgement is provided that the uploaded contents have been durably stored. The problem is that conventional systems often incur a significant amount of time and expense to ensure that the uploaded contents are durably stored, and this significant amount of time causes latency and performance costs for the upload.

Therefore, there is a need for an improved approach to implement an upload to a cloud storage environment that addresses the issues identified above.

SUMMARY

Some embodiments are directed to an approach for implementing a mechanism to perform uploads to a cloud storage system. In some embodiments, a low latency upload process is employed to provide faster confirmation of a successful upload, particularly for smaller file uploads. The improved approach serves to improve upload performance without sacrificing data durability or shard file integrity.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Some embodiments are directed to an approach to more efficiently perform uploads of content to cloud-based storage. This permits the user to more quickly receive acknowledgement of a successful upload, without incurring any excess latency for the uploads.

Figure 1A:
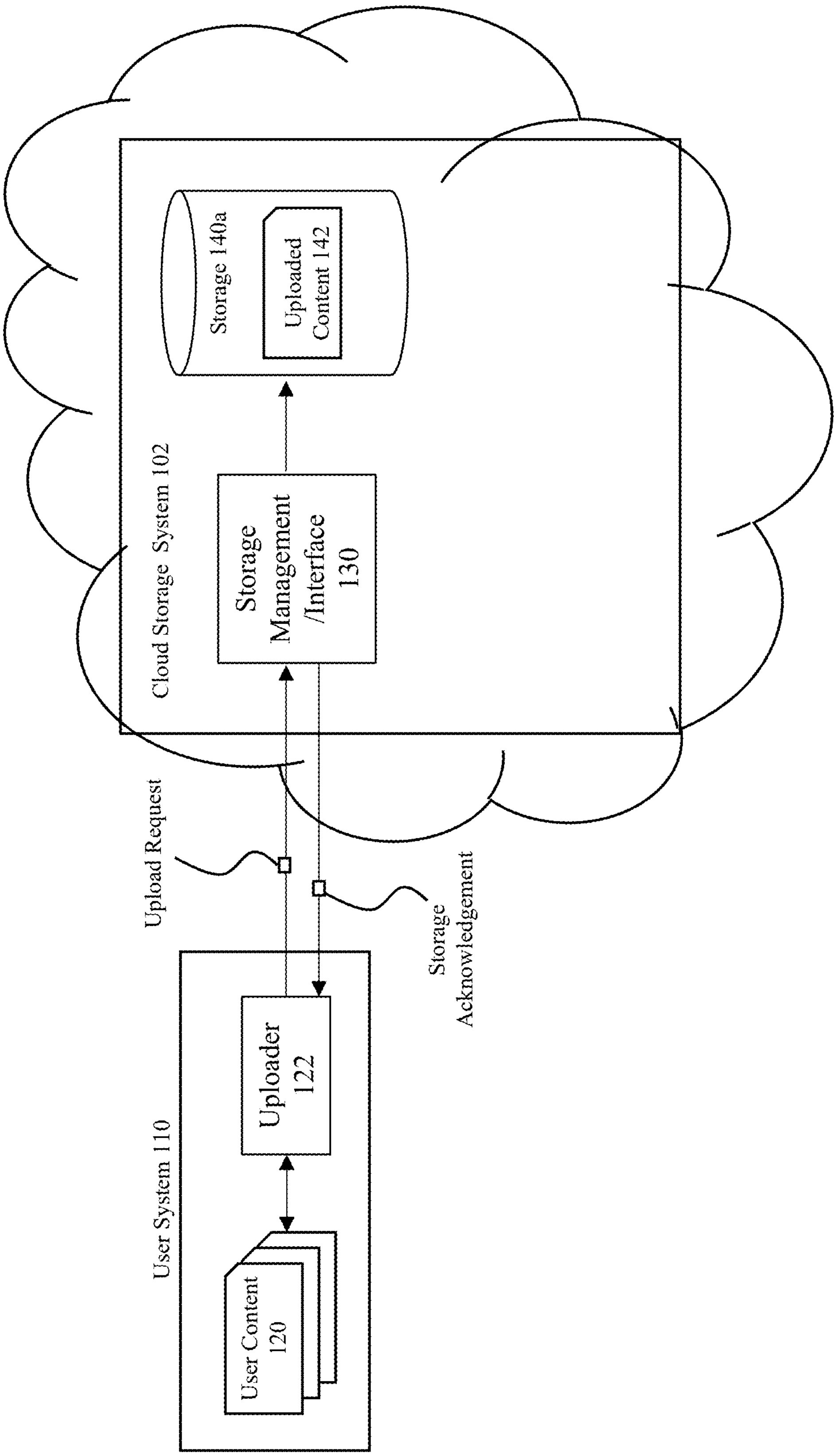
FIG. 1A provides a high-level illustration of how an upload is typically performed.

FIG. 1A provides a high-level illustration of how an upload is typically performed. This figure shows a cloud storage system 102 that includes one or more cloud storage resources 140*a* that are used by one or more cloud users 110 for storage of uploaded content. The cloud storage system 102 may be embodied as any system that provides storage resources in the cloud. Examples of such cloud storage systems include for instance Amazon's S3 storage service and cloud storage provided by Backblaze, Inc. The cloud storage resources 140*a* correspond to any type of resource that may be allocated and used within a cloud storage environment. The cloud storage resources 140*a* comprise any combination of hardware and software that allows for ready access to the data that is located at a computer readable storage device. For example, the cloud storage resources 140*a* could be implemented as computer memory (e.g., persistent memory) operatively managed by an operating system or in more persistent storage such as hard disks (HDDs) or network-based storage devices. The data in the cloud storage resources 140*a* could also be implemented as database objects and/or files in a file system.

One or more users or applications use a user station 110 to interact with the cloud storage system 102. The user station 110 comprises any type of computing station that may be used to operate or interface with the cloud storage system 102. Examples of such an access or user system include, for example, workstations, personal computers, mobile devices, remote computing terminals, servers, cloud-based services, or applications. The access/user system may comprise a display device, such as a display monitor, for displaying a user interface to users at the station. The access/user system may also comprise one or more input devices for the user to provide operational control over the activities of the architecture, such as a mouse or keyboard to manipulate a pointing object in a graphical user interface to generate user inputs.

The user may generate user content 120 that is currently stored locally at the user station 110. However, the user may choose to upload the content 120 from the user station 110 to be stored into the cloud at the cloud storage system. The upload process may cause the user content 120 to be stored as uploaded content 142 within the cloud storage resources 140*a* at the cloud storage system 102.

The user may employ an uploader 122 to perform the process of uploading the content 120 to be stored into the cloud within the cloud storage system 102. Any suitable type of uploader may be employed to implement the upload processing. For example, a standalone uploader application may be employed to upload the content to the cloud. In addition, a command line interface (CLI) approach may be employed to implement the uploader. For example, a CLI such as Boto3 may be used to upload content into AWS S3 cloud storage. One or more system/software developers kits (SDKs) may also be used to interface with specific cloud storage vendors to implement an uploader. These SDKs may correspond to any suitable programming language or system, e.g., using Python or Java. The uploader may also be implemented using application programming interfaces (APIs) provided by the cloud storage vendor to interface with the functionality of their respective cloud storage systems.

The uploader 122 will interact with a storage management/interface/coordinator 130 at the cloud storage system 102 to perform the upload process. The CLI commands and/or API calls made by the uploader will be received at the storage management/interface/coordinator 130 to upload the content 120, and to make sure the desired storage functionality and parameters are identified as part of the CLI/API instructions. The cloud storage system will then perform internal operations within the system to store the uploaded content 142 within the cloud storage resources 140*a* at the cloud storage system 102.

The upload process may employ a multipart upload process to upload a single content object as a set of parts, where each part is a contiguous portion of the content object's data. The uploader may choose to upload these parts independently of each other, and can upload these parts in any order. This is helpful to computational cost and efficiency, for instance, where the uploader uses a multi-threaded approach to upload multiple parts at the same time in parallel in order to reduce the latency of the upload process. For larger objects that are uploaded over a stable high-bandwidth network, the multipart upload can serve to maximize the use of available bandwidth by uploading object parts in parallel for multi-threaded performance. When uploading over a less-reliable network connection, the multipart upload can increase resiliency to network errors by avoiding upload restarts, since when using multipart upload, the system only needs to retry uploading just the parts that were previously interrupted during the upload, rather than requiring a restart of the entire upload the beginning for the entire content object.

There are numerous approaches that can be taken to organize the storage infrastructure at the cloud storage system. By way of illustration, one possible approach could be to organize the infrastructure to include a plurality of "vaults", which are logical units that each includes multiple (e.g., 20) storage pods, with data evenly spread across the storage pods. Each storage pod is a physical machine (such as a server device) that includes storage components such as memory and storage drives. In a given vault, the pods may have the same number of drives, and the drives can be selected to all have the same size. Drives in the same drive position in each of the 20 storage pods are grouped together into a storage unit called a "tome." Each file is stored in one tome, and is spread out across the tome for durability and availability.

As noted above, a file that is uploaded can be broken into pieces before being stored. Each of those pieces is called a "shard." Parity shards can also be added to add redundancy so that a file can be fetched from storage even if some of the pieces are not available. In some embodiments, each file is stored as 20 shards, which includes seventeen data shards and three parity shards. Those shards are distributed, for example, across 20 storage pods in 20 cabinets, which serves to provide resiliency in the event of a failure, power loss, or networking outage. In the event of a failure situation, the stored files are still available because they can be reconstructed from the available pieces that are available among the data shards and parity shards. Any suitable approach can be taken to implement the desired redundancy. For example, some embodiments may employ Reed-Solomon erasure encoding to create the parity shards. The Reed-Solomon encoding provides the advantage that the original file can be recreated using any 17 of the shards. If one of the original data shards is unavailable, it can be re-computed from the other 16 original shards, plus one of the parity shards. Even if three of the original data shards are not available, they can be re-created from the other data and parity shards.

When performing the upload process, the uploader 122 will send the upload request to the cloud storage system 102, where the individual shards are loaded into respective pods within storage 140*a*. Processing will then occur to ensure that the storage process has completed before a storage acknowledgment can be provided back to the user's device to indicate that the upload has completed successfully.

The issue addressed by the current disclosure is that the upload process needs to ensure that the uploaded content has been durably stored before the storage acknowledgment can be provided back to the user, and given the amount of processing that is needed to ensure this durability, a significant amount of latency may occur before the storage process is completed and the storage acknowledgement can be sent back to the user.

Figure 2A:
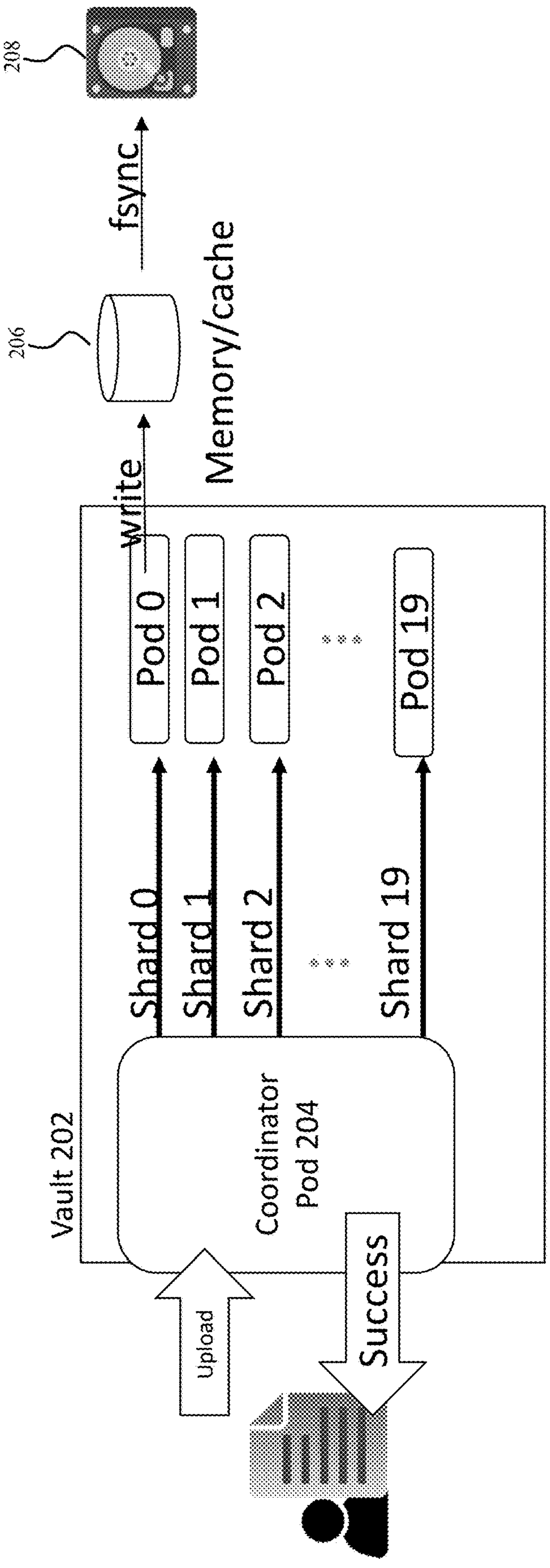
FIG. 2A illustrates a file upload scenario.

To explain, consider the file upload scenario shown in FIG. 2A. Here, a user/client attempts to uploads data to coordinator pod 204 at vault 202. The coordinator pod partitions uploaded data into 20 shards and concurrently uploads each shard to a distinct pod in the vault. Each pod will receive its respective shard, and will write the data to an in-memory filesystem buffer. When all of the shard data has been written to the filesystem, the pod issues a system call (e.g., an fsync system call) to force the data from memory to the underlying physical disk (e.g., a data drive). When all pods have confirmed the previous step, then the coordinator pod will return a status code to the client indicating a successful upload.

What is notable is that there is both a fixed cost component and a variable cost component to the overhead that is expended to perform the upload. What this means is that if the size of the upload is relatively small, then the overall cost to upload a smaller file may be disproportionately affected by the fixed costs. This problem may particularly result in excessive latencies when uploading small files to the cloud storage system.

For example, in some systems, the fsync call can be quite expensive. Since performing an fsync corresponds to somewhat of a fixed cost, this call disproportionally impacts small file uploads more. In fact, a vast amount (up to 90%) of the time spent storing single-segment shards (e.g., a 1 MB file comprises single-segment shards) is expended to performed fsync on the shard file and its directory.

Embodiments of the present invention provide an improved approach to perform uploads to a cloud storage system, where particular embodiments can improve small file upload speeds by reducing and/or eliminating the cost of performing the fsync call.

Figure 1B:
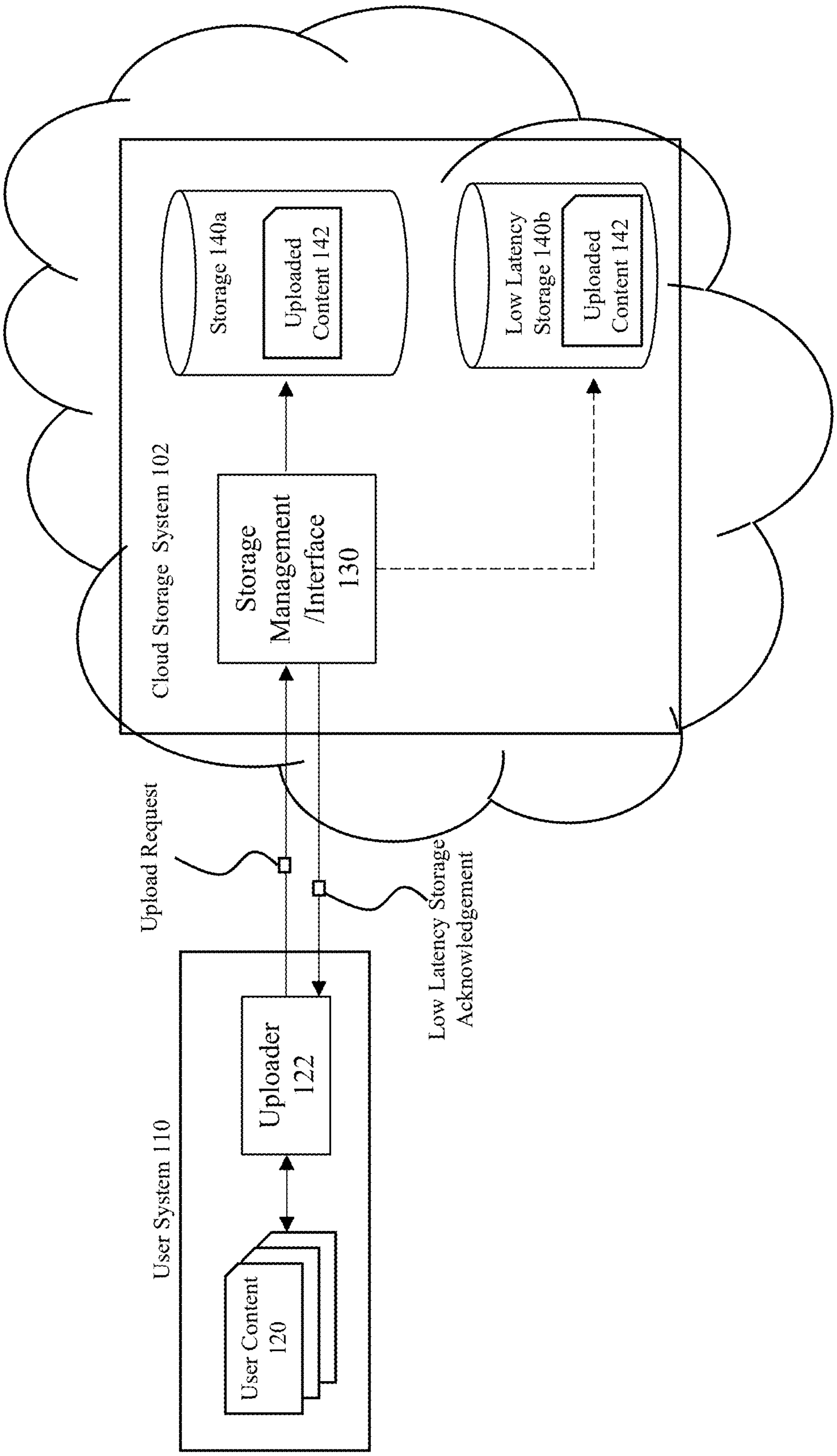
FIG. 1B shows a high-level view of some embodiments of the invention.

FIG. 1B shows a high-level view of the solution according to some embodiments. At the cloud storage system 102, an additional set of low latency storage 140*b* is now provided—in addition to the existing non-low latency storage 140*a*. The low-latency storage 140*b* comprises storage devices that have much faster storage characteristics as compared to the existing storage 140*a*. For example, low-latency storage may include storage devices such as durable flash devices, e.g., NVMe devices (Non-Volatile Memory Express devices which may be implemented using SSDs). The existing storage 140*a* is still needed to retain the upload content in a long-term storage location that can be accessed by downstream services or users.

However, during the upload process itself, instead of waiting for the uploaded content to be durably stored in storage 140*a* before a storage acknowledgment is provided back to the user device, this type of acknowledgment can now be provided after the successful storage of the uploaded content into just the low latency storage 140*b*. Since storage into the low-latency storage device is much faster, this allows the storage acknowledgment to be provided much quicker than the previous approach. This also allows the uploaded content to be fsynced asynchronously into the non-low latency storage 140*a* at a later point in time without affecting the ability to return acknowledgement of a successful upload back to the user.

Figure 2B:
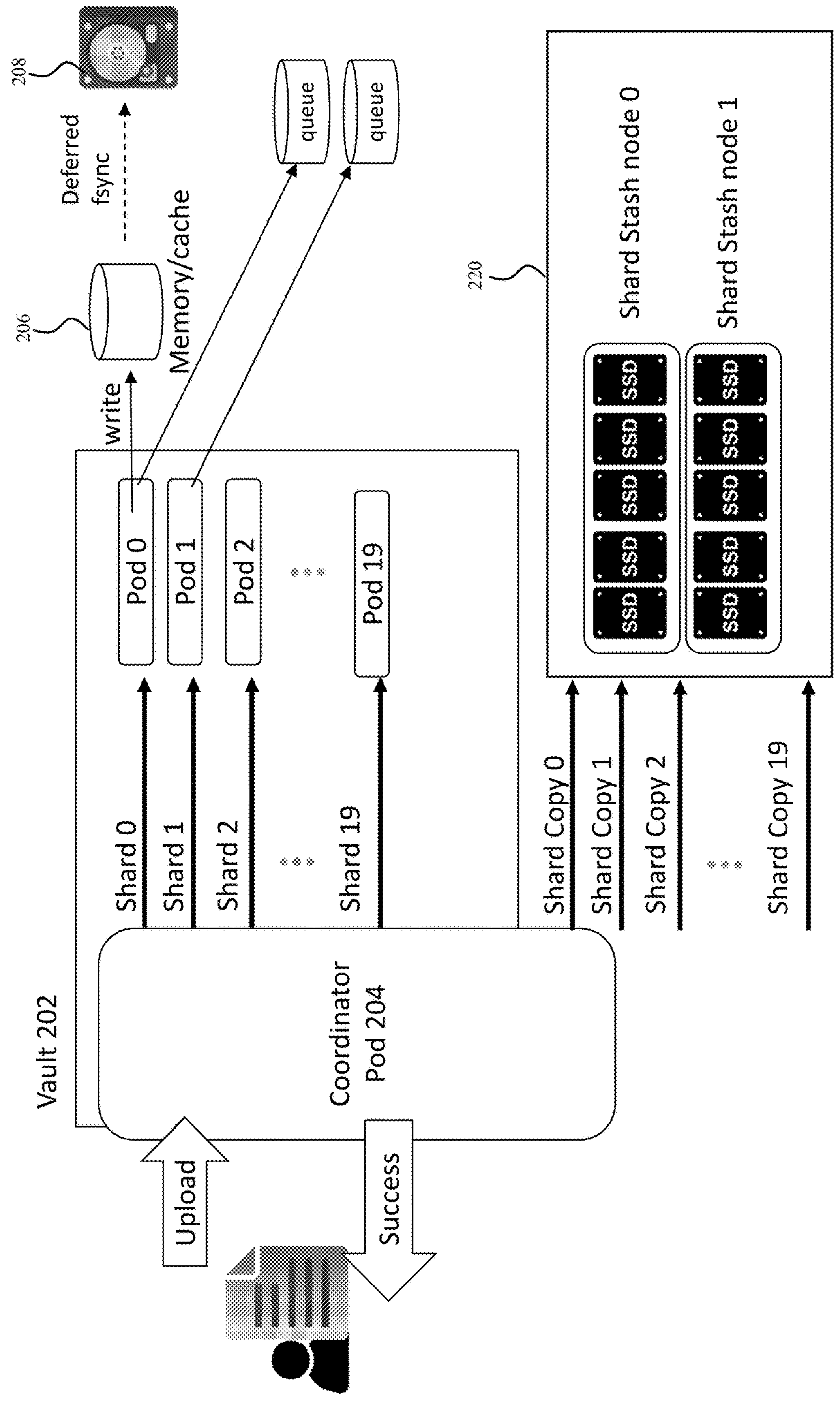
FIG. 2B illustrates a file upload architecture according to some embodiments of the invention.

Further details according to some embodiments are shown in FIG. 2B. As shown in this figure, a pool 220 of fast, durable flash storage devices are deployed in each datacenter to accelerate the storage of shards of small file uploads during uploads. For uploads that are addressed by this solution, shards will simultaneously be written to both the flash storage and the spinning data drives that will store them long-term.

In some embodiments, the writes to the flash storage will occur synchronously with respect to the success confirmation messaging, while writes to the non-flash storage devices will occur asynchronously. In one embodiment, the system will only allow one shard to finish its write asynchronously. Writing synchronously to the flash storage will allow this approach to avoid an approach that entirely hinges on an acknowledgment from only the fsyncs that are normally performed on the data drives 208, which will reduce the initial time that is spent storing shards before a success acknowledgement can be returned to the client. This will lead to a significant improvement to upload time for the targeted files. The data still needs to be fsynced to the data drives 208 eventually however. An asynchronous process will verify the shards are synced to the slower spinning disks, and then allow space on the flash storage to be freed when the low latency shards can be safely deleted. In some additional embodiments, 19 out of 20 successes (e.g., to either/both the low latency and non-low latency storage) are considered, where if the first 19 shards, for example, to the non-low latency filesystems succeed, then the system can let the $20^{th}$ finish asynchronously.

It is noted that asynchronously fsyncing shards to the spinning drives on pods may create the potential to lose recently written shards on the pods'data drives in the event of a failure. This is one reason why the current approach also synchronously writes to the flash drives. This is to ensure that there is always at least one durably-stored copy of a shard. In the event of a failure, the system will copy the missing data from the low-latency storage to the data drives on the pods.

Figure 3:
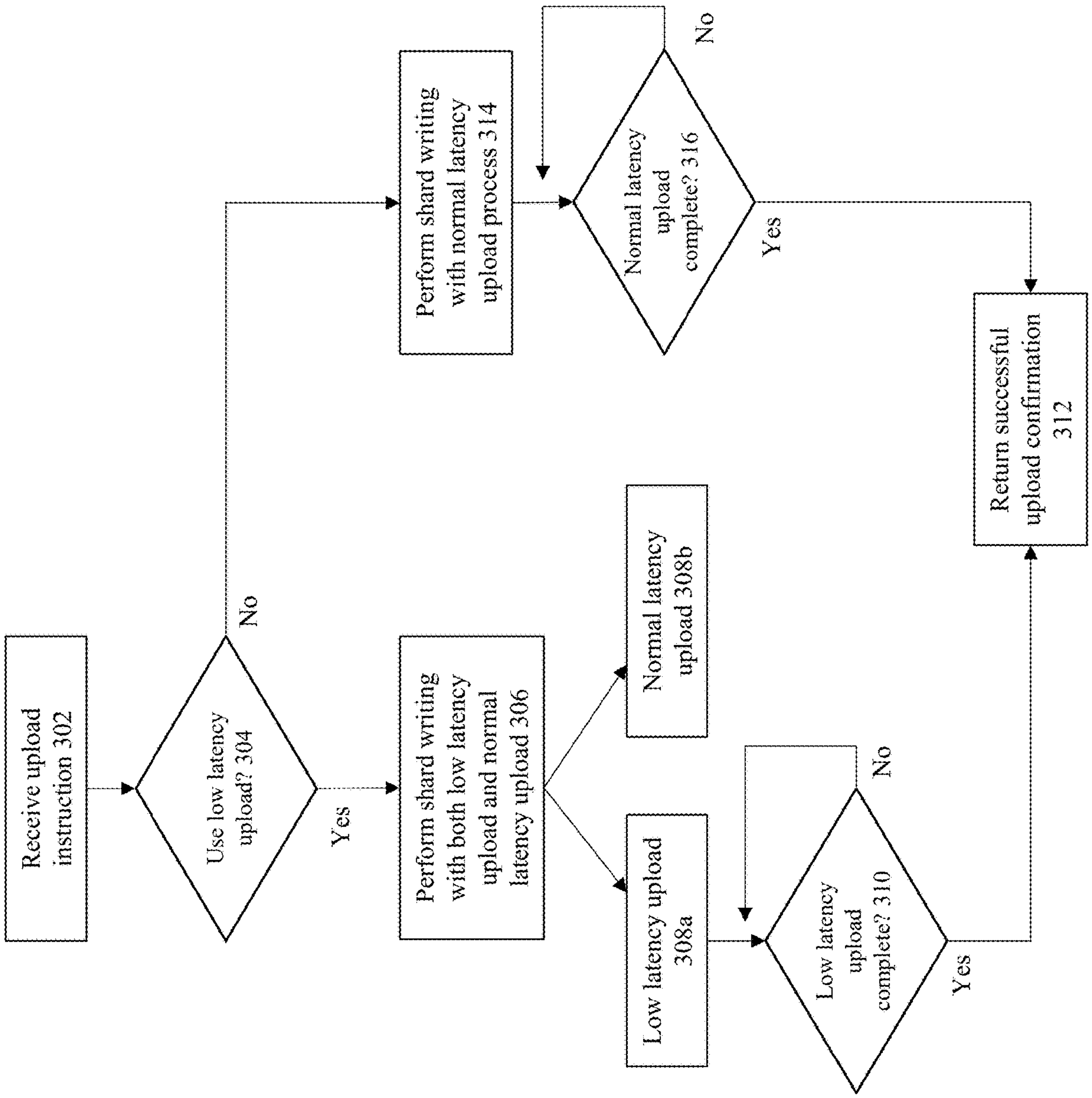
FIG. 3 shows a flowchart of processing that occurs according to some embodiments of the invention.

FIG. 3 shows a flowchart of processing that occurs according to some embodiments of the invention. At 302, an upload instruction is received to upload user content to the cloud storage system. A determination is made at 304 whether the low latency upload approach should be used or should not be used.

If the determination is that the low latency upload should not be used, then step 314 is performed to implement the upload process with just the normal processing. For example, this approach will partition the uploaded data into multiple shards, load each shard to a separate pod in a vault, where each pod will write the data to an in-memory filesystem buffer. When all of the shard data has been written to the filesystem, the pod issues an fsync system call to move the data from memory to the underlying physical disk. At 316, a determination is made whether all pods have confirmed that the fsync has completed for the upload data. If so, then at 312, a confirmation message is provided to the client to indicate a successful upload.

If the determination of 304 is that the low latency upload should be used, then step 306 is performed to implement the upload process with both the low latency upload process at 308*a* and the normal latency upload process at 308*b*. In one embodiment, the determination of whether to send a message for successful uploads is based only upon the low latency path for step 308*a*, and not the normal latency path of step 308*b*. In an alternative embodiment, determination of whether to send a success code relies on at least: (a) that 19/20 shards have been written and fsynced to the low latency storage; and (b) 19/20 shards have been written to normal-latency storage and fsyncs have been queued up for asynchronous processing.

At 310, a determination is made whether the required low latency processing has reached a point where the uploaded data has been durably stored in the low latency storage devices. If so, then at 312, a confirmation message is provided to the client to indicate a successful upload.

Step 304 was performed to make a determination of whether or not the low latency upload approach should be used. The reason this step is performed is because it is possible that not all circumstances warrant the use of the currently described low latency approach for uploads.

Figure 4:
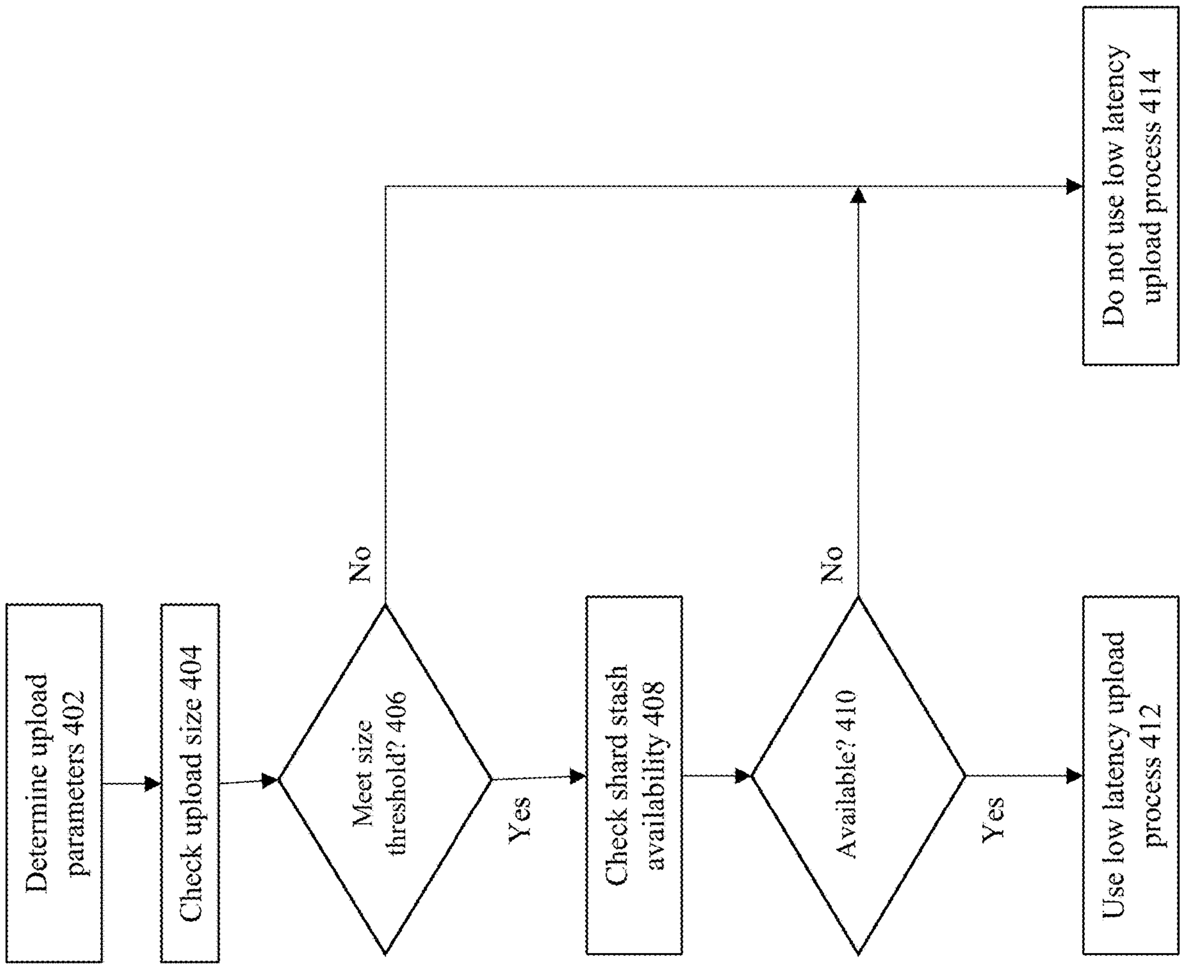
FIG. 4 shows a flowchart of an embodiment of an approach to determine whether the low latency approach should be used.

FIG. 4 shows a flowchart of an embodiment of an approach to determine whether the low latency approach should be used. At 402, a determination is made of the upload parameters. These include any parameters that may affect a determination of whether the low latency approach should be used. For example, one criterion (describe further below) pertains to the size of the upload. Therefore, an example of a parameter that may be determined at step 402 is the size of the file(s) being uploaded.

At 404, the size of the upload is checked against a size threshold. Any suitable size threshold may be selected as appropriate for the specific system in which the current invention is to be used. In some embodiments a threshold of 1 MByte is selected. A determination is made at 406 whether the upload meets a designated size threshold. If not, then at 414, the decision is made not to use the low latency upload process. It is noted that some embodiments may impose a minimum and/or maximum size as well.

The intent of these actions is to target relatively smaller file for the use of the low latency upload approach. There are numerous reasons for targeting smaller files. As previously explained, the fixed costs of performing an upload involving the fsync system call tends to be a much larger percentage of overall costs for uploading small files, as opposed to larger files where the proportion of the fixed costs (for fsync) tends to shrink as the file size becomes larger. Therefore, there is a much larger payback for undergoing the additional expense of performing the low latency upload process for smaller files. In addition, it has been found that in many cloud storage systems, smaller files tend to represent a relatively large percentage of all uploads. Moreover, the overall costs to implement the infrastructure for the low latency storage path will cost significantly less if only smaller files are targeted as opposed to an approach where all files (including larger files) are targeted, since less storage would need to be deployed if applied only to smaller files.

If at 406 it is determined that upload size does meet the designated threshold, then additional checks may be performed for additional criteria. For example, it is possible that due to fluctuations in system and upload demand, that the low latency storage drives may not have sufficient capacity to handle the size of the current upload. Therefore, a determination can be made at 408 of the availability of the low latency storage to handle the desired upload. If it is determined at 410 that the low latency storage path is available, then at 412, the low latency upload process is employed. If not available, then at 414, the decision is made not to use the low latency upload process.

It is noted that other filters and criteria may also be used to determine whether to use the low latency upload techniques described herein, and thus the inventive concepts are not limited to just the criteria shown in this figure. For example, if there is limited availability of space in the low latency storage devices, then perhaps an ordering is performed such that higher priority workloads have precedence over lower priority workloads. As another example, different users may be associated with various different service level agreement (SLA) tiers or paid performance tiers, and it is possible that certain users may not be qualified to benefit from the low latency techniques if they are in a different SLA tier from one associated with the low latency mechanism.

It is possible that the low latency storage process is just completely unavailable at certain points in time. For example, it may be disabled, e.g., upon the occurrence of a critical error. In this situation, the checks of FIG. 4 (such as an upload size check) need not be performed, and instead the system simply defaults to the standard use of the low latency approach for all uploads.

Figure 5:
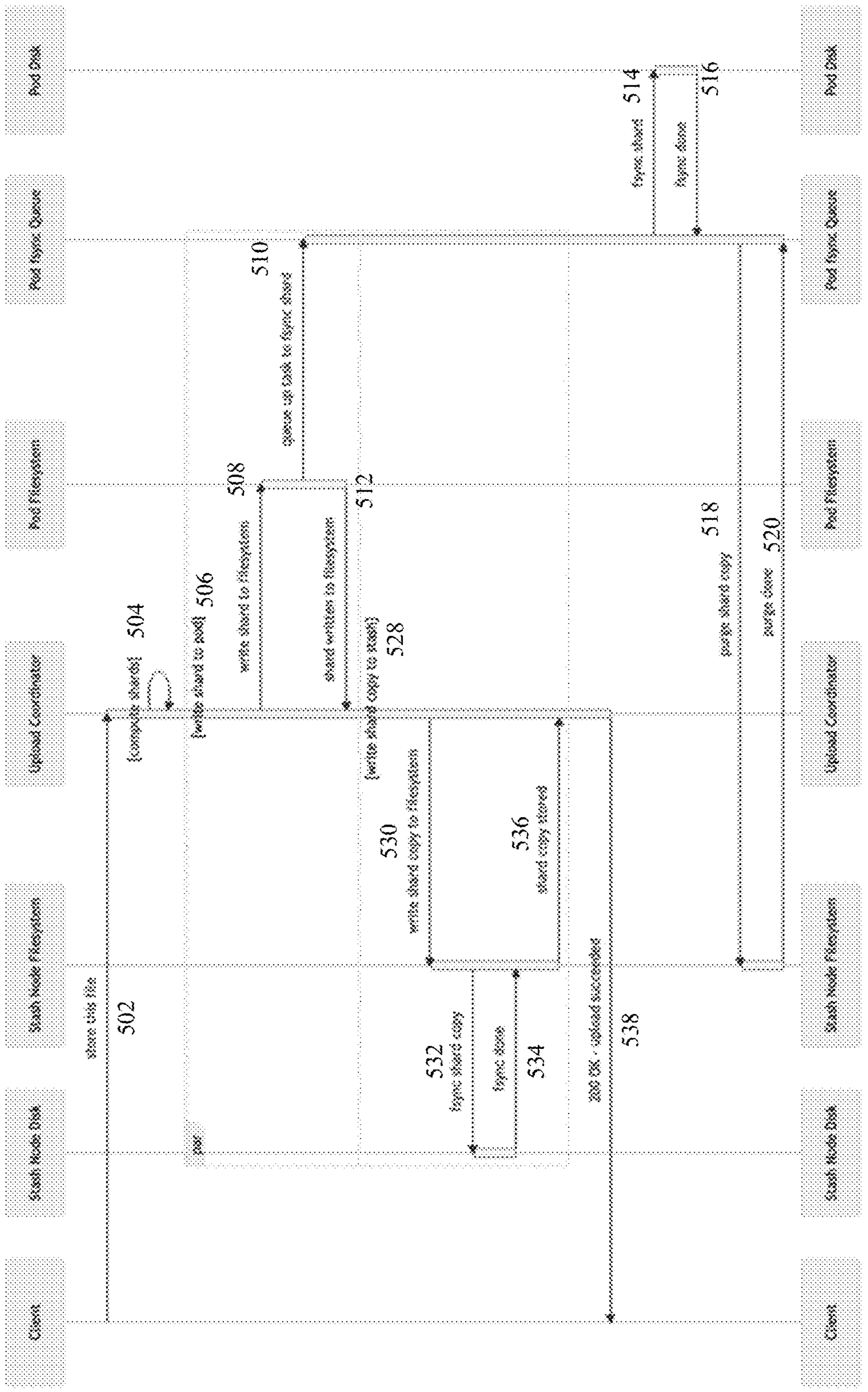
FIG. 5 shows a more detailed sequence diagram of actions that are performed and an identification of the specific entities that perform those actions for an upload process according to some embodiments of the invention.

FIG. 5 shows a more detailed sequence diagram of actions that are performed and an identification of the specific entities that perform those actions for an upload process according to some embodiments of the invention. The following entities/actions are described in this sequence diagram: (a) Shard stash node, stash node: a single machine that makes up a shard stash; (b) Shard stash: the complete collection of shard stash nodes that belong to a single datacenter; (c) Shard stash drive, stash drive: a single drive on a shard stash node; (d) Pod data drive, data drive: a single data drive on a vault pod; (e) Shard: a fragment of an uploaded file that gets written to and stored on a pod data drive; (f) Shard copy: a byte-for-byte duplicate of a shard; gets stored on a shard stash drive; (g) Purging: the act of deleting shard copies from the shard stash.

At 502, a client will provide instructions to perform an upload. The upload instruction will be sent from the client to an upload coordinator. At 504, the upload coordinator will compute the shards that need to be stored and will then initiate the storage of the shard(s) using both a low latency mechanism as well as the standard non-low latency mechanism.

At this point, two parallel paths will be taken by the system. One parallel path starts with 506, where the upload coordinator will provide instructions to write one or more shards to one or more pods. The other parallel path starts with 528 where the upload coordinator will provide instructions to write one or more shards to the shard stash.

In the low latency path of 528, action 530 is performed to write a shard copy to the filesystem of the low latency storage system. Initially, the shard may be located in a memory component of the shard stash system. At 532, fsync is performed to move a copy of the shard from the memory component of the shard stash to its durable storage device (e.g., a NVMe device). At 534 an indication is received that the fsync has competed. At 536, the stash node filesystem provides information to the upload coordinator to indicate that the shard copy has been stored. Thereafter, at 538, the upload coordinator can now provide a message to the client indicating that the upload is successful. In one embodiment, the system waits for acknowledgement from path 506 that 19 out of 20 writes to the in-memory filesystem succeeded and the fsync was queued up for asynchronous processing before an acknowledgement is provided. It is noted that in some embodiments, it is important for the upload coordinator to receive 512—where the message stated for example that the shards (at least 19/20) were written to the filesystems on the pods. This ensures that the pods can serve downloads immediately after the upload is successful. In another embodiment, the message can be provided to the client without waiting for any confirmation from path 506 of a successful upload for that upload path.

In the non-low latency path of 506, action 508 is performed to write a shard to the pod filesystem. Initially, the shard may be located in a memory component of the pod system. At 510, the pod filesystem may queue up a task to fsync the shard that was written to the memory component of the pod system. At 514, the task is taken off the queue to be performed, and therefore fsync is performed to move a copy of the shard from the memory component of the pod system to its durable storage device (e.g., a pod disk). At 516 an indication is received that the fsync has competed. Since the shard has now been durably stored in the pod, this means the shard copy stored in the shard stash can be deleted at this point, and that space freed up to store another shard. Therefore, at 518, an instruction is provided to the stash node filesystem to purge the shard copy. At 520, after that purge has been performed, a confirmation is provided back to indicate the successful purging of the shard copy.

When selecting specific disks in the shard stash to store shard copies, it is noted that when the upload coordinator begins processing an upload, it needs to identify which stash drives will store the uploaded file's shard copies. One constraint that can be imposed is that two shard copies of the same FGUID cannot be stored on the same stash drive. However, the system can allow storing multiple shard copies on the same stash node, which allows the system to deploy fewer stash nodes without impacting durability.

When selecting which stash drives to use for an upload, the system should consider how to balance the load on the stash nodes and drives. The system distributes the writes to the shard stash so that some stash drives are not filled up earlier than others, which will serve to maximize the number of drives available for writes. The system also distributes the writes so that bottlenecks are not encountered in the NICs, or in the links between the CPU and the stash drives.

In one embodiment of a load management system, the system will probabilistically select stash drives weighted by their free space. In some embodiments, assuming the system utilizes all drives equally, the shard stash hardware should be sized large enough to avoid bottlenecks. This strategy should also keep stash drives filled at roughly the same level.

One situation that may disrupt this strategy is when new empty stash drives, or new nodes with many new empty stash drives, are added to the stash. The new stash drives will have weights that ask for too much traffic. One possible safeguard is to cap how much free space a drive can advertise. If a stash drive only advertises the free space it can reasonably fill in a specific time period (e.g., 5 minutes), then new drives should not get overloaded. This means that a new stash drive may not advertise any more free space than its peers.

To balance the storage used in the stash, the idea is that purging old shard copies should be rapid enough so that after a few minutes, all shard copies uploaded before the new stash drives entered the pool are gone. Weighting by free space is a technique that can be implemented to avoid uploading to a stash drive that is close to full. This does rely on purging to "keep up" with new uploads. It is noted that due to probabilistic assignment of shard copies to stash drives, the shard copies from a single pod will be roughly uniformly distributed amongst all the stash drives. So even when a pod falls behind on purging, it will not be hurting one stash drive in particular.

If all drives begin to fill up, there will not be enough drives with a nonzero weight. The upload coordinator will notice this and will fall back to the slower method of storing shards for an upload.

With regards to upload errors, it is possible that there will be errors writing shards or shard copies to their respective drives. In some embodiment, the system requires 19 out of 20 shards to be stored on the data drives. For some implementations, that logic can be extended by requiring both the shard stash and the vault to report success for 19 out of 20 shards for the upload to be a success.

The system can react to stash nodes becoming unavailable, e.g., for maintenance reasons. If a stash node is selected for an upload, and it goes down, the upload coordinator may not notice immediately. Since multiple shards can be stored on a node, this could cause fewer than 19 shards to be stored in the stash. In this case, if 19 or more shards have been successfully written to the filesystems on pods, the upload coordinator has the option to attempt to save the upload by issuing fsync calls to the pods to force the data to disk. This would sacrifice performance in favor of increasing our success rate. In this case, any data written to the shard stash is not needed.

With regards to the fsync queue, in some embodiments every pod maintains an ephemeral, in-memory fsync queue for each one of its data drives. An entry in the queue represents a shard that needs to be fsynced to its data drive. Entries are added when a shard is completely and successfully written to the filesystem as part of an upload. An entry contains the identifier for the local shard, and the stash drive and stash node where the shard copy resides. Processing each entry involves fsyncing the indicated shard, and upon success, issuing a purge request to the relevant stash node. If the fsync fails, the entry is dropped and no purge request is issued. If the purge request fails, the pod moves on. In either failure case the next recovery scan will ensure the consistency of the shard and purge the shard copy. Each queue will have a corresponding thread that is constantly working to fsync any available items. Its rate will be configurable via dynamic config.

Figure 6:
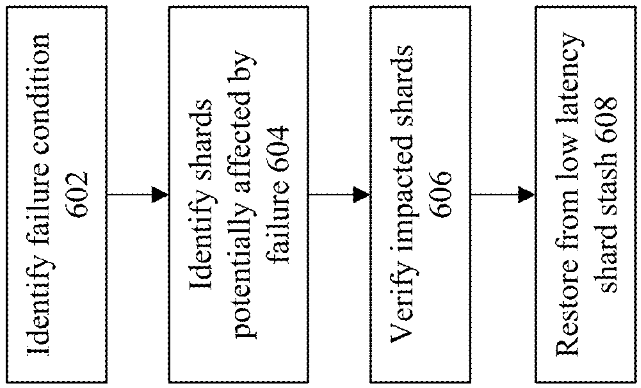
FIG. 6 shows a flowchart of the processing that can be performed by a recovery mechanism in some embodiments of the invention.

Some embodiments provide a recovery mechanism to ensure the integrity of shard data after any event that is capable of causing data loss on the pods' data drives. FIG. 6 shows a flowchart of the processing that can be performed by a recovery mechanism in some embodiments of the invention.

At 602, a failure condition or event is identified that may require recovery to be performed. One example of such an event is unexpected power loss to a pod. However, it is noted that any failure that affects the integrity of the shard written to the pod may cause the need to perform a recovery.

At 604, identification is made of the shard(s) that are potentially affected by the failure. In general, at any point in time there will be recently uploaded shards that are waiting to be fsynced. In a failure such as a power loss scenario, the shards that are waiting will not be fsynced. Upon regaining power, their presence and integrity are not guaranteed, so they need to be verified. The recovery mechanism is the component responsible for identifying all shards that may have been impacted. At 606, the recovery mechanisms will also verify each potentially impacted shard. Thereafter at 608, any missing and/or corrupted shards will be restored from the shard copies stored in the shard stash.

It is noted that certain actions may be taken to identify the shards to recover. In the system, the purging mechanism removes a shard copy from the shard stash when the shard copy has been confirmed to be durably stored in the vault. If a shard copy is still present in the stash, it identifies something that needs to be verified on a data drive. A recovery scan can list all shard copies in the stash, and verify the existence and fingerprint (e.g., a SHA1 fingerprint) of the corresponding shard on its local data drive. If the shard is missing or corrupted, the pod will restore it from its shard copy in the stash. Upon successfully verifying/restoring a shard, the pod will purge its shard copy from the stash.

With regards to purging, the action to purge shard copies from the shard stash is performed to prevent the shard stash from running out of storage space. By purging in a timely manner, this allows the system to reduce the required capacity of the shard stash, which in turn reduces how much the stash costs. This also permits the system to reduce how much work the recovery mechanism needs to perform, allowing it to reduce resource usage and perform faster. In addition, this permits a simplified load balancing logic when selecting stash drives during upload.

There are numerous ways to implement a purge of a shard copy. In one possible approach, after shards are written to the pod in its in-memory filesystem, the fsync queue generates a task to fsync each shard. If the fsync is successful, a request will be sent to purge the corresponding shard copy in the shard stash. Another approach pertains to the recovery scan, where the recovery scan examines every shard copy in the shard stash it is interested in. As it verifies/restores the corresponding shard on its data drive, it will purge the shard copy that is no longer needed. Collectively these two methods will ensure no shard copy gets leaked into the shard stash permanently.

Therefore, what has been described is an improved approach to perform uploads to a cloud storage system. The improved approach serves to improve upload performance, particularly for smaller uploads, without sacrificing data durability or shard file integrity.

System Architecture

Figure 7:
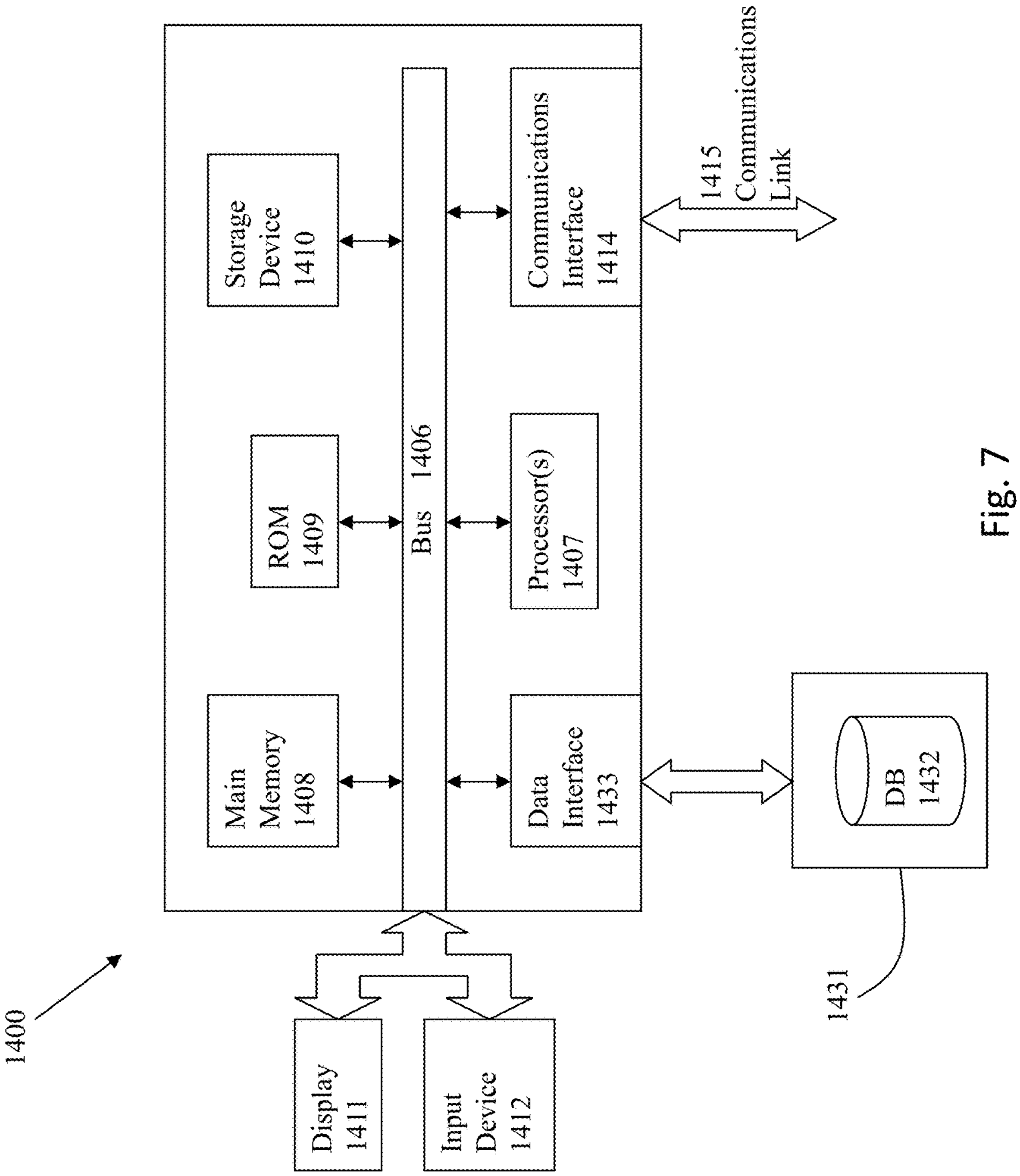
FIG. 7 is a block diagram of an illustrative computing system suitable for implementing an embodiment of the present invention.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to some embodiments of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1410 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 in a storage medium 1431 may be used to store data accessible by the system 1400.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 8:
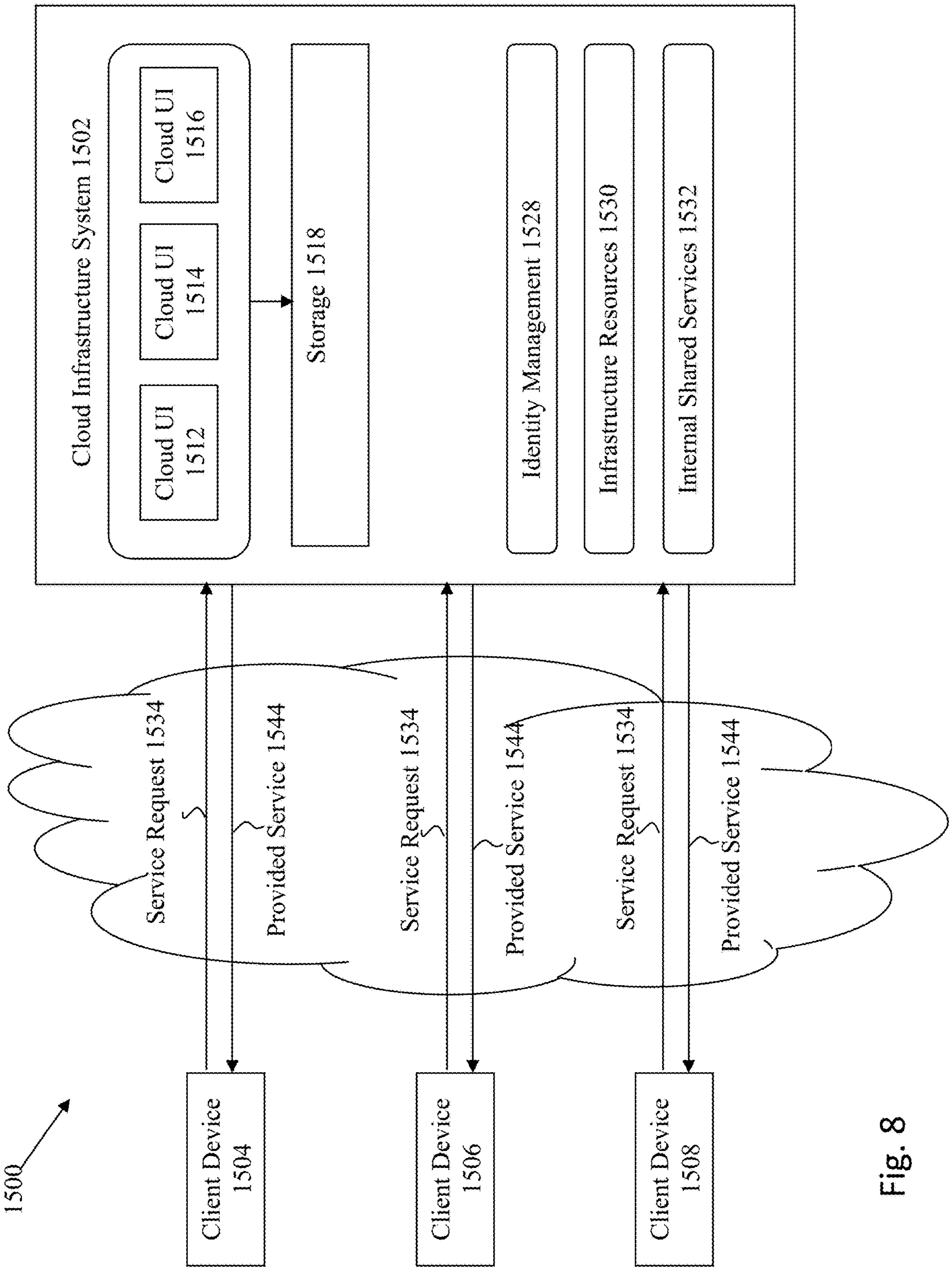
FIG. 8 is a block diagram of one or more components of a system environment in which services may be offered as cloud services, in accordance with an embodiment of the present invention.

FIG. 8 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the invention. In some other embodiments, cloud infrastructure system 1502 may have more or fewer components than shown in the figure, may combine two or more components, or may have a different configuration or arrangement of components. Client computing devices 1504, 1506, and 1508 may be devices similar to those described above for FIG. 14. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially-available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the user's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a user in a self-service, subscription-based, elastically scalable, reliable, highly available, and secure manner.

In various embodiments, cloud infrastructure system 1502 may be adapted to automatically provision, manage and track a user's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A user, via a subscription order, may order one or more services provided by cloud infrastructure system 1502. Cloud infrastructure system 1502 then performs processing to provide the services in the user's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, users can utilize applications executing on the cloud infrastructure system. Users can acquire the application services without the need for users to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Users can acquire the PaaS services provided by the cloud infrastructure system without the need for users to purchase separate licenses and support.

By utilizing the services provided by the PaaS platform, users can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer users a Database as a Service in the form of a database cloud. Middleware cloud services may provide a platform for users to develop and deploy various business applications, and Java cloud services may provide a platform for users to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for users utilizing services provided by the SaaS platform and the PaaS platform.

In certain embodiments, cloud infrastructure system 1502 may also include infrastructure resources 1530 for providing the resources used to provide various services to users of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1502 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a user's subscription received by cloud infrastructure system 1502, and the like.

In one embodiment, as depicted in the figure, cloud management functionality may be provided by one or more modules, such as a storage module 1518. These modules may include or be provided using one or more computers and/or servers, which may be general purpose computers, specialized server computers, server farms, server clusters, or any other appropriate arrangement and/or combination.

In operation 1534, a user using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the user may access a cloud User Interface (UI), cloud UI 1512, cloud UI 1514 and/or cloud UI 1516 and place a subscription order via these UIs. The order information received by cloud infrastructure system 1502 in response to the user placing an order may include information identifying the user and one or more services offered by the cloud infrastructure system 1502 that the user intends to subscribe to.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about users who wish to utilize the services provided by cloud infrastructure system 1502. Such information can include information that authenticates the identities of such users and information that describes which actions those users are authorized to perform relative to various system resources (e.g., files, directories, applications, communication ports, memory segments, etc.) Identity management module 1528 may also include the management of descriptive information about each user and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer program product embodied on a computer readable medium, the computer readable medium having stored thereon a sequence of instructions which, when executed by a processor, executes a method comprising:

receiving instructions to upload content to a cloud storage system;

partitioning the content into a plurality of shards;

uploading the plurality of shards through two storage paths in the cloud storage system, wherein a first storage path comprises faster storage devices compared to the second storage path; and after initiating storage of the plurality of shards to both the first storage path and the second storage path wherein synchronous storage is performed to the first storage path and asynchronous storage is performed to the second storage path, and without waiting for the plurality of shards to be asynchronously stored in the second storage path, providing a success acknowledgement based upon synchronous storage of the plurality of shards in the first storage path having the faster storage devices.

2. The computer program product of claim 1, wherein a determination is made to upload the plurality of shards through the first storage path having the faster storage devices.

3. The computer program product of claim 2, wherein the determination to upload the plurality of shards through the first storage path having the faster storage devices is based at least in part upon a size for the content being uploaded, wherein a threshold is established to only allow relatively smaller files to be uploaded through the first storage path having the faster storage devices.

4. The computer program product of claim 3, wherein the threshold comprises 1 Mbyte.

5. The computer program product of claim 1, wherein the first storage path having the faster storage devices comprises NVMe devices.

6. The computer program product of claim 1, wherein the success acknowledgement is provided when at least one of the following occurs: (a) 19/20 shards have been written and fsynced to the first storage path; or (b) 19/20 shards have been written to the second path and fsyncs have been queued up for asynchronous processing.

7. The computer program product of claim 1, wherein the plurality of shards is purged from the first storage path having the faster storage devices.

8. The computer program product of claim 7, wherein the plurality of shards is purged from the first storage path after the second storage path is fsynced for the plurality of shards.

9. The computer program product of claim 1, wherein a recovery is performed to copy one or more shards from the first storage path to the second storage path.

10. A system, comprising:

a processor;

a memory for holding programmable code; and wherein the programmable code includes instructions executable by the processor for: receiving instructions to upload content to a cloud storage system; partitioning the content into a plurality of shards; uploading the plurality of shards through two storage paths in the cloud storage system, wherein a first storage path comprises faster storage devices compared to the second storage path; and after initiating storage of the plurality of shards to both the first storage path and the second storage path wherein synchronous storage is performed to the first storage path and asynchronous storage is performed to the second storage path, and without waiting for the plurality of shards to be asynchronously stored in the second storage path, providing a success acknowledgement based upon synchronous storage of the plurality of shards in the first storage path having the faster storage devices.

11. The system of claim 10, wherein a determination is made to upload the plurality of shards through the first storage path having the faster storage devices.

12. The system of claim 11, wherein the determination to upload the plurality of shards through the first storage path having the faster storage devices is based at least in part upon a size for the content being uploaded, wherein a threshold is established to only allow relatively smaller files to be uploaded through the first storage path having the faster storage devices.

13. The system of claim 12, wherein the threshold comprises 1 Mbyte.

14. The system of claim 10, wherein the first storage path having the faster storage devices comprises NVMe devices.

15. The system of claim 10, wherein the success acknowledgement is provided when at least one of the following occurs: (a) 19/20 shards have been written and fsynced to the first storage path; or (b) 19/20 shards have been written to the second path and fsyncs have been queued up for asynchronous processing.

16. The system of claim 10, wherein the plurality of shards is purged from the first storage path having the faster storage devices.

17. The system of claim 16, wherein the plurality of shards is purged from the first storage path after the second storage path is fsynced for the plurality of shards.

18. The system of claim 10, wherein a recovery is performed to copy one or more shards from the first storage path to the second storage path.

* * * * *